United States Patent [19]
Holmes

[11] 4,447,170
[45] May 8, 1984

[54] CONNECTION ASSEMBLY FOR USE WITH AN ARTICULATED LINKAGE SYSTEM

[76] Inventor: Ralph Holmes, 216 Diana Dr., Burley, Id. 83318

[21] Appl. No.: 353,964

[22] Filed: Mar. 2, 1982

[51] Int. Cl.³ .......................................... F16C 11/00
[52] U.S. Cl. ...................................... 403/64; 248/278; 403/97; 403/146; 354/293
[58] Field of Search ................ 403/97, 91, 64, 146, 403/148, 149, 84; 354/293; 411/349, 347; 24/221 K, 221 R; 248/278, 282, 284, 285, 286, 287

[56] References Cited

U.S. PATENT DOCUMENTS

| 2,423,432 | 7/1947 | Barlow | 24/221 K |
| 3,322,886 | 5/1967 | Warshawsky | 403/146 X |
| 3,379,403 | 4/1968 | Meehan | 248/278 |
| 3,550,519 | 12/1970 | Lewis | 354/293 |
| 3,550,519 | 12/1970 | | 354/293 |
| 4,091,402 | 5/1978 | Siegel | 354/293 |
| 4,091,402 | 5/1978 | Siegel | 354/293 |
| 4,104,623 | 8/1978 | Sloop | 354/293 |
| 4,104,623 | 8/1978 | Sloop | 354/293 |

Primary Examiner—Cornelius J. Husar
Assistant Examiner—Joseph A. Fischetti
Attorney, Agent, or Firm—Alan M. Biddison; Joseph G. Seeber

[57] ABSTRACT

The connection assembly includes two generally L-shaped brackets having arms with through bores defined in their end portions. One of the bores of the first bracket is alignable with a mounting bracket for other component of a linkage system. Similarly, one of the bores of the second L-shaped bracket is alignable with another component of the linkage system. Other bores of the L-shaped brackets are alignable with each other. A bolt is insertable through each of the pairs of aligned shafts to releasably interconnect the parts. A spring is positioned between the head of the bolt and one of the surfaces of the combined parts for exerting a biasing force tending to fix the relative positions between the parts. The connection assembly provides three adjustment axes so that an end of the linkage system can be positioned and releasably retained at any desired orientation.

2 Claims, 5 Drawing Figures

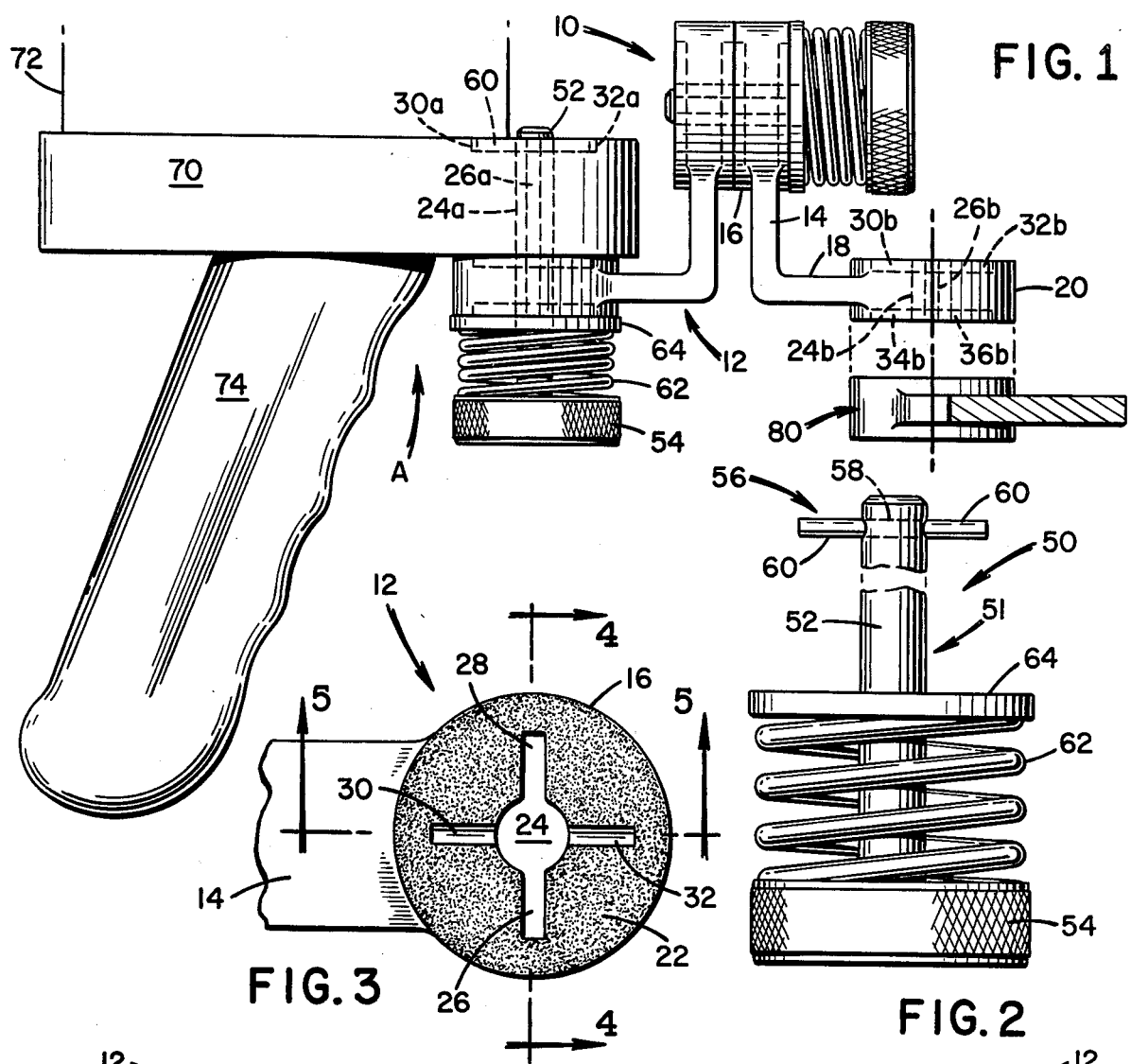
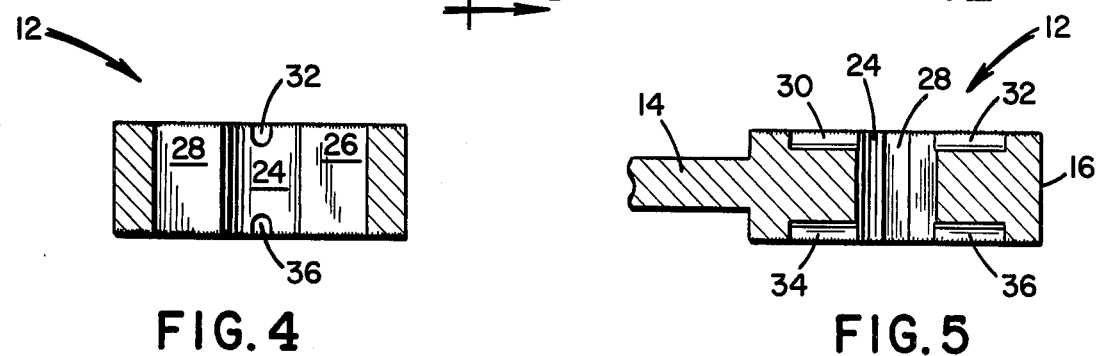
U.S. Patent    May 8, 1984    4,447,170

CONNECTION ASSEMBLY FOR USE WITH AN ARTICULATED LINKAGE SYSTEM

BACKGROUND OF THE INVENTION

Field of the Invention

The present invention relates to a connection assembly used in an articulated linkage system. More particularly, the present invention provides a connection assembly usable in an articulated linkage system connecting a flash unit with a camera.

SUMMARY OF THE INVENTION

The present invention provides a connection assembly usable with an articulated linkage assembly of the type described in copending U.S. patent application Ser. No. 298,368, entitled "Electronic Flash Unit Assembly", filed Sept. 1, 1981. The contents of such copending application are herein incoporated by reference.

The referenced application describes an electronic flash unit assembly for a camera that has a mounting bracket connectable to a tripod socket of a camera, a housing containing a flash unit, and an articulated linkage system for interconnecting the mounting bracket and the housing of the flash unit. The power source for the flash unit is incorporated in either the mounting bracket or a separate power supply. The linkage system is comprised of relatively light weight articulated flash arms that are adjustable to position the electronic flash tube housing in a desired position with respect to the object or objects being photographed. Preferably, the output of the power supply used to trigger the flash tube is adjustable to provide a variable flash output. Such assembly is especially useful to provide illumination for macrophotography.

One of the objects of the present invention is to provide an improved connection assembly usable with the articulated linkage system described in the copending application. The connection assembly provided by the present invention is positionable between the mounting bracket and an end of one of the linkage arms. Alternatively, the connection assembly is positionable between ends of two of the linkage arms. Still another alternative is to position the connection assembly between an end of one of the linkage arms and the housing for the flash device. It should also be appreciated that a plurality of connection assemblies can be used between various components of the articulated linkage system.

In one embodiment of the invention, the connection assembly has two L-shaped brackets. Arms of each of the brackets have bores formed in their outer end portions. One of the bores of the first bracket is connectable to the mounting bracket, and one of the bores of the second bracket is connectable to an end of one of the linkage arms. Other bores of the two brackets are connectable to each other.

Preferably, the bores in all of the components, that is, the bore in the mounting bracket, the bores in the L-shaped brackets, and the bore in the end of the linkage arm, have the same configuration. Each bore has a central portion for receiving the shaft of a bolt used to interconnect the components and a portion protruding from the central portion to allow passage of a pin connected to a distal end of the shaft. Shallow recesses extend radially outwardly from both ends of the bore in outer surfaces of the respective components to receive and retain the pin after it has been passed through the aligned bores and rotated. Outer end surfaces of the components are appropriately modified to enhance frictional contact between confronting surfaces.

A bolt of a connection device is insertable through the aligned bores to releasably interconnect the components. The shaft carries a pin in its distal end that passes through the enlarged portion of the bore. After the shaft has been inserted through the bores, the head of the bolt is rotated so that the pin is received in the shallow recess or groove. A spring exerts a biasing force between the bolt head and an outer surface of one of the interconnected components. The force tends to fix the angular relationship between the two interconnected components. A washer is interposed between an end of the spring and the pin to prevent the spring from falling off of the shaft when the bolt is removed from the bores.

The pin, which extends transversely to the axis of the shaft, keeps the flat washer and spring from falling off of the main shaft. The shallow recess, in combination with the pin, makes it possible to retain the bolt in the bore of one component only so that the bolt is readily available for use. The brackets and pin are assembled by inserting the shaft of the bolt through the aligned bores in the ends, compressing the spring, and turning the head of the bolt so that the transverse pin drops into the recess or indentation. This provides for rapid assembly and disassembly of the device. Further, the shaft will self-store in the end of one bracket. The two brackets cooperate with each other to allow instant positioning of an end of the linkage assembly in any plane.

The invention, and its objects and advantages, will become more apparent in the following description of a presently preferred embodiment of the device.

BRIEF DESCRIPTION OF THE DRAWINGS

In the following description of a preferred embodiment of the present invention, reference is made to the accompanying drawings, in which:

FIG. 1 is an elevation view of one embodiment of a connection assembly according to the present invention;

FIG. 2 is an enlarged side view of a connection device used with the connection assembly of FIG. 1;

FIG. 3 is an end view of a component of the connection assembly of FIG. 1;

FIG. 4 is a view along line 4-4 of FIG. 3; and

FIG. 5 is a view along line 5-5 of FIG. 3.

DESCRIPTION OF THE PREFERRED EMBODIMENT

The present description will be directed in particular to elements forming part of, or cooperating more directly with, the present invention. Elements not specifically shown or described herein are understood to be selectable from those known in the art.

Referring now to the drawings, and to FIG. 1 in particular, one embodiment of a connection assembly according to the present invention, generally designated 10, is illustrated. The connection assembly 10 is illustrated in a position interconnecting components of a linkage assembly of the type described in U.S. patent application Ser. No. 298,368.

The connection assembly 10 includes two L-shaped brackets, generally designated 12. Each of the brackets 12 has an arm 14 with an end portion 16 and an arm 18 with an end portion 20. The end portions 16 and 20 have been illustrated as being slightly thicker than the remaining portions of the brackets so as to provide sufficient rigidity. It should be appreciated that the end portions can be the same thickness, or even thinner, than the other portions of the bracket, depending on the particular material used to manufacture the brackets.

As best illustrated in FIG. 3, the end portion 16 of component 12 has a surface 22 that is roughened to enhance frictional engagement between the surface and a confronting surface of another component. It should be appreciated that the surface 22 can be formed with a series of raised and recessed portions complementary to similar portions provided on the surface of the other component. It is preferable for both exterior surfaces of the end portion 16 to be provided with roughened surfaces so that either surface can be used as an engagement surface with another component.

The end portion 16 has a through bore 24 extending therethrough and radially enlarged portions 26 and 28 extending outwardly from the bore. As can be seen from FIGS. 4 and 5, the bore 24 and the enlarged portions 26 and 28 extend between opposed exterior surfaces of the end portion 16. Shallow recesses or indentations 30 and 32 are provided in one surface of the end face, while similar recesses 34 and 36 are provided in the opposed surface of the end face. The end portion 20 is provided with a similarly shaped bore 24b, enlarged portions 26b and 28b, and recesses 30b, 32b, 34b, and 36b.

Referring now to FIG. 2, a connection device, generally designated 50, is illustrated that provides means for releasably interconnecting two adjacent components of the system. The device 50 includes a bolt, generally designated 51, with a shaft 52 having a proximal end connected to an enlarged head 54. A pin, generally designated 56, extends through and is rigidly fixed in a bore 58 formed in the distal end of the shaft 52. End portions 60 of the pin extend outwardly from the shaft 52. While the pin 56 is rigidly affixed in the bore 58 in the embodiment illustrated in FIG. 2, it is also possible to provide a friction fit between the pin 56 and the bore 58. Further, the pin 56 can be replaced with a pin mounted for pivotal movement about an axis carried by the distal end of the shaft between a position in which the pin extends parallel with the axis of the shaft and a position in which the pin extends perpendicular to the axis of the shaft. With such embodiment, the enlarged portions 26 and 28 of the through bore 24 are no longer required.

A spring 62 is positioned on the shaft 52 and has one end portion adjacent the head 54. The other end of the spring is adjacent a washer or disk 64. The disk 64 has a center opening slightly larger than the diameter of the shaft 52 so that the shaft guides sliding movement of the disk. The disk opening is less than the length of the pin 56 so that the pin retains the disk and spring on the shaft. It should be appreciated that the spring can have a reduced diameter portion at its end so that the disk 64 can be eliminated. The force of the spring 62 is sufficiently strong to maintain the end portions 60 of the pin 56 in the recesses 30 and 32 when the shaft 52 extends through either one or two components. As a result, the device 50 is easily transported and readily available for use.

Referring again to FIG. 1, it should be noted that the mounting bracket 70, which is similar to the mounting bracket or housing for the power source of the electronic flash unit assembly described in U.S. patent application Ser. No. 298,368, has a through bore 24a formed therein that is similar to the through bore 24. Also, enlarged portions, one of which, designated 26a, is illustrated, extend outwardly from the bore 24a. Depressions or recessed portions 30a and 32a, which are similar to the recesses 30 and 32, respectively, are provided in one end surface of the mounting bracket 70. Similar recesses (not shown) preferably are provided in the opposed end surface of the bracket. Also, both sides of the mounting bracket are provided with bores so that a flash assembly can be connected to either side, or flash assemblies can be connected to both sides.

The mounting bracket is designed to be releasably connected to a camera 72, and carries a handle or pistol grip 74. The handle 74 is provided to facilitate handling of the mounting bracket and flash assembly when the assembly is interconnected with the camera and when the assembly is detached from the camera.

Considering now the use of the present invention, one of the end portions 20 of a bracket 12 is positioned with a surface thereof in engagement with a confronting surface of the mounting bracket 70, and the radially enlarged portions of the bore 24 are aligned with the radially enlarged portions of the bore 24a. The head 54 is then rotated to align the end portions 60 of the pin 56 with the radially enlarged portions. Bolt 51 is then moved in the direction of the arrow A in FIG. 1 to insert the shaft 52 through the aligned bores. Rotation of head 54 then seats ends 60 of the pin in the recesses 30a and 32a. Bracket 12 is then rotated with respect to mounting bracket 70 to position the components in a desired orientation. The force of the spring 62 is sufficiently strong to hold the components in such orientation.

In a similar manner, confronting end portions 16 of two L-shaped brackets 12 are interconnected by another connecting device 50. Similarly, end portion 20 of the second L-shaped bracket 12 is connected to an end portion 80 of a flash arm of the type described in U.S. patent application Ser. No. 298,368.

It should be readily apparent that the end portion of the L-shaped bracket 12 connected to the mounting bracket 70 defines with the mounting bracket a first, vertically extending adjustment axis. A second, horizontally extending adjustment axis is defined by the interconnected end portions of the two L-shaped brackets. A third adjustment axis is defined by the interconnected end portions 20 and 80. It should be readily apparent from FIG. 1 that the orientation of the third adjustment axis is a function of the angular orientation or relationship between the interconnected ends of the L-shaped brackets. The third adjustment axis can extend horizontally, vertically, or in a direction skewed to the horizontal and vertical.

As a result, the interaction between the three adjustment axes allows positioning of the flash device carried by the outermost end of the articulated flash arm assembly to be positioned in any desired orientation with respect to the object or objects being photographed. Further, the forces exerted by the springs 62 on the interconnected components are sufficiently strong to maintain the assembly in the desired orientation. On the other hand, the forces of the springs are sufficiently weak to allow ready readjustment and repositioning of the flash unit.

Previously, a specific embodiment of the present invention has been described. However, it should be appreciated that such description has been for the purposes of illustration only, without any intention of limiting the present invention. Rather, it is the intention that the invention be limited only by the appended claims.

What is claimed is:

1. An articulated linkage system for interconnecting a camera and a flash unit, comprising:
    a mounting bracket connectable to a camera and having a through bore formed therein,
    a flash arm connectable to said flash unit and having a through bore formed therein, and
    linkage means for interconnecting the mounting bracket with the flash arm;
    wherein said linkage means comprises:
    first and second angle brackets having arms with through bores formed in end portions thereof, one of the through bores of the first bracket being aligned with the through bore in the mounting bracket, and one of the through bores of the second bracket being aligned with the through bore in the flash arm, other through bores of said angle brackets being aligned with each other,
    a plurality of bolts, each bolt having a shaft extending through a respective one of the pairs of aligned through bores for interconnecting the parts having the through bores, each bolt further having an enlarged head connected to a proximal end of the shaft for limiting movement of the shaft in a first direction with respect to the through bores, and each bolt further having a pin carried by a distal end of the shaft, the pin having an end portion protruding from the shaft, each through bore having an enlarged portion for passage of the pin end portion through the through bore and terminating in an end surface with a recess formed therein for receiving the pin end portion, the pin when received in said recess preventing movement of the shaft in a direction opposite the first direction, and
    biasing means positioned between the enlarged head of the bolt and the pin for exerting a biassing force on the parts interconnected by the bolt tending to fix the angular relationship of the parts with respect to each other.

2. The linkage system according to claim 1, wherein each of the end portions of the first and second angle brackets has opposing surfaces between which its respective through bore extends, and wherein at least one of the opposing surfaces of at least one of the end portions of at least one of the first and second angle brackets is provided with means for increasing frictional engagement with a contacting surface.

* * * * *